United States Patent [19]

Suzuki et al.

[11] Patent Number: 4,505,843

[45] Date of Patent: Mar. 19, 1985

[54] HETERODIAZOLE ELECTROACTIVE POLYMERS

[75] Inventors: Shigeto Suzuki, San Francisco; Victor P. Kurkov, San Rafael; Albert H. Schroeder, Richmond; Peter Denisevich, Jr., El Cerrito, all of Calif.

[73] Assignee: Chevron Research Company, San Francisco, Calif.

[21] Appl. No.: 442,399

[22] Filed: Nov. 17, 1982

[51] Int. Cl.$^3$ .............................................. H01B 1/00
[52] U.S. Cl. ................................... 252/500; 252/512; 252/518; 528/183; 528/341; 528/363
[58] Field of Search ...................... 528/363, 183, 341; 525/500, 510, 518, 512

[56] References Cited

U.S. PATENT DOCUMENTS

| | | | |
|---|---|---|---|
| 3,130,182 | 4/1964 | Frazer | 528/363 |
| 3,130,183 | 4/1964 | Frazer | 528/363 |
| 3,734,893 | 3/1973 | Studinka et al. | 528/363 |
| 3,966,987 | 6/1976 | Suzuki et al. | 252/500 |
| 4,344,869 | 8/1982 | Blinne et al. | 252/500 |
| 4,344,870 | 8/1982 | Blinne et al. | 252/500 |
| 4,360,644 | 11/1982 | Naarman et al. | 252/500 |
| 4,375,427 | 3/1983 | Miller et al. | 252/500 |

*Primary Examiner*—Lester L. Lee
*Attorney, Agent, or Firm*—S. R. LaPaglia; T. G. DeJonghe; C. J. Caroli

[57] ABSTRACT

Tractable doped electroactive polymers, comprising recurring units of a 1,3,4-heterodiazole, wherein the heteroatom is oxygen or sulfur, and a sufficient concentration of a charge-compensating ionic dopant associated therewith.

23 Claims, No Drawings

HETERODIAZOLE ELECTROACTIVE POLYMERS

BACKGROUND OF THE INVENTION

This invention relates to electroactive organic polymeric materials. More specifically, this invention relates to associating electroactivating agents known in the art as dopants with an organic polymer.

Recently, research has been conducted into organic polymeric materials in order to modify their room temperature electrical conductivity by reacting them with electron donor or acceptor molecules. The electron donor or acceptor molecules, generally known in the art as n- and p-type dopants respectively, can transform the organic polymeric materials so that these modified organic polymeric materials exhibit semiconducting and metallic room temperature electrical conductivity. Polyacetylene is an example of an organic polymeric material whose room temperature electrical conductivity can be modified over several orders of magnitude above its insulator state, by the incorporation of dopant molecules, A. J. Heeger et al, U.S. Pat. No. 4,222,903, said patent incorporated herein by reference. Other examples of organic polymeric materials whose room temperature electrical conductivity can be enhanced by several orders of magnitude over their insulator state by means of incorporation of dopant molecules are poly-p-phenylene, polypyrrole, poly-1,6 heptadiyne, and polyphenylene vinylene. However, all of the above recited examples are of organic polymeric materials which are completely insoluble or infusable and hence are completely intractable.

Other examples of organic polymers whose room temperature electrical conductivity can be modified with the aid of dopants are polyphenylene sulfide and poly-m-phenylene. However, the above recited materials though being tractable in their original virgin state, undergo irreversible chemistry when reacted with dopants which modify their room temperature electrical conductivity. This irreversible chemistry imparts upon these dopant modified organic polymeric materials a state of intractability. Upon removal of the doping agents, these materials do not revert to the chemical structure which they originally exhibited prior to being modified by the dopants. The inorganic material polysulfur nitride is also considered a polymeric conductor. As with the previously recited polymeric materials, polysulfur nitride is also completely intractable.

The synthesis of poly(1,3,4-oxadiazole-2,5-diylvinylene) and poly(1,3,4-oxadiazole-2,5-diyl-ethynylene) is described by I. Schopov et al. in Makromolecular Chemie, vol. 179, No. 1, pp. 63-71 (1978). These undoped oxadiazole polymers are shown by Schopov to exhibit an electrical conductivity characteristic of insulators.

For use in a wide variety of electronic device applications, it is highly desirable to have available organic polymeric electrically conducting materials having a preselected room temperature conductivity which can be varied over a broad range. This range should preferably extend from the insulator state of the unmodified organic polymeric material through the semiconducting regime and extending into the highly conducting metallic state. It is also desirable that these organic polymeric electrically conducting materials should be tractable and hence processable so that useful articles of any desired shape and size can be fabricated. Tractable organic polymers are those which can be readily shaped, formed, molded, pressed, cast, etc., into desired articles from the liquid state, i.e. either from the melt, fluid glassy state, or from solution after the completion of the polymerization reaction of the organic polymeric material.

SUMMARY OF THE INVENTION

We have invented an electroactive polymeric material comprising a dopant modified organic polymer whose room temperature electrical conductivity is controlled in a highly selective and reversible manner. Electroactive polymer is defined as a polymer having a conductivity which has been modified with electron acceptor or donor dopants to be greater than the conductivity of the virgin state of the polymer. The electroactive organic polymeric material is fabricated from a virgin polymer, which in itself is completely tractable and processable and which exhibits excellent mechanical and thermal properties as well as being highly stable to oxidative degradation, by modifying the polymer with a conductivity modifier, i.e. electron donor dopants or electron acceptor dopants. The electroactive organic polymeric material is comprised of recurring units of a 1,3,4-heterodiazole, wherein the heteroatom is oxygen or sulfur, and a conductivity modifier. More specifically, the electroactive polymer is a charged polymer backbone incorporating a sufficient concentration of charge-compensating ionic dopants, i.e., ions of opposite charge to the charge of the polymer backbone. A sufficient concentration of ionic dopants is defined as that concentration which, when associated with the polymer, effects a significant increase in the polymer conductivity, i.e., on the order of about 10% or greater. The recurring units are diradicals. The diradicals are directly linked to one another, or may be connected to one another via connecting units. A "connecting unit" is defined as any atom or group of atoms which can link the hereinabove diradicals together into a polymer chain.

This application is related to our commonly assigned copending application, Ser. Nos. 442,397, entitled "Heteroazole Electroactive Polymers", and 442,398, entitled "Triazole Electroactive Polymers", filed concurrently herewith, the disclosures of which are incorporated herein by reference. These applications are related to the extent that each discloses electroactive polymers containing recurring diradical units of 5-membered heterocyclic ring systems which contain at least one nitrogen atom in the ring, and which can be generally represented by the following structural formula:

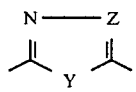

wherein Y is O, S or N-R, wherein R is alkyl of 1 to 6 carbon atoms or phenyl; Z is N or C-$R^1$, wherein $R^1$ is hydrogen, alkyl of 1 to 6 carbon atoms, phenyl, or a bond into the polymer chain; with the proviso that when $R^1$ is a bond into the polymer chain, then one of the remaining carbon atoms in the ring must be bonded to a hydrogen.

Among other factors, the present invention is based on our discovery that 1,3,4-heterodiazole polymers, in particular 1,3,4-oxadiazole and 1,3,4-thiadiazole polymers, can be effectively doped with conductivity modifiers to provide electroactive polymers having an electrical conductivity several orders of magnitude greater than the conductivity of the undoped virgin polymers. In addition, the electroactive polymers of the invention have been found to be highly tractable and processable and therefore overcome the disadvantages of prior art materials.

An n-type electroactive organic polymer is obtained by reacting the virgin polymer with reducing or electron donor dopants. Electron donor dopants induce n-type conductivity in the polymer by donating an electron to the polymer and reducing same to a polyanion and the dopant is oxidized to a cation. Similarly, a p-type electroactive organic polymer is obtained by reacting the virgin polymer with oxidizing electron acceptor dopants. Electron acceptor dopants induce p-type conductivity in the polymer by oxidizing the polymer to a polycation and the dopant is reduced to an anion. The desired value of the room temperature electrical conductivity of the dopant modified electroactive organic polymer is preselected by controlling the level of incorporation of the dopants into the virgin polymer. Alternatively, the desired value of the room temperature electrical conductivity of the dopant modified electroactive organic polymer is preselected by controlling the length of the reaction time between the virgin polymer and dopants. Furthermore, the highly selective and reversible modification of the room temperature electrical conductivity of the virgin polymer can proceed by either chemical or electrochemical means. The highly selective and reversible modification of the electrical conductivity of the dopant containing organic polymeric material together with the tractability and processability of the virgin polymer is highly desirable in that the fabrication of useful articles and devices such as primary and secondary batteries, photovoltaic devices, Schottky type devices can be accomplished. Furthermore, the materials described in this invention can be utilized as active components in such devices and articles as electrochromic displays and photolithographic processes.

DETAILED DESCRIPTION OF THE INVENTION

Electroactive organic polymers are tractable and processable virgin polymers consisting of recurring units of a heterodiazole ring system modified by suitable conductivity modifiers. The polymers are composed of repeating diradical units derived from heterodiazole ring systems wherein the heteroatoms are oxygen or sulfur. A diradical is defined as a molecule that has two unsatisfied positions available for linking into the polymer chain. Optionally, the diradicals are separated in the polymer chain by connecting units.

Suitable examples of heterodiazole recurring units are 1,3,4-oxadiazole, 1,3,4-thiadiazole, and mixtures thereof. The recurring units can be interspersed with one or more connecting units such as O, S, aryl, substituted aryl, alkenyl, thioalkenyl, thioaryl, and the like. Preferred connecting units are 1,4-phenylene, 4,4'-biphenylene, —CH=CH—, and —C≡C—. A particularly preferred connecting unit is 1,4-phenylene. The connecting units can be the same or different between adjacent recurring units in the polymer chain.

The polymer can be a homopolymer of the heterodiazole diradicals or a copolymer of the diradicals. A homopolymer is defined as a polymer comprising the same recurring diradical. A copolymer is defined as a polymer comprising different diradicals. In addition, the polymer is a copolymer if the same or different recurring diradicals are interspersed with connecting units.

The polymer is rendered electroactive by incorporating into the virgin polymer a conductivity modifier. More specifically, the polymer is rendered electroactive by adding electrons to (reducing) or removing electrons from (oxidizing) the virgin polymer backbone. This can be accomplished by incorporating into the virgin polymer a conductivity modifier which is either an electron donor dopant or an electron acceptor dopant. An electron donor dopant donates an electron to the polymer, the polymer becoming reduced to a polyanion and the dopant becoming oxidized to a cation. An electron acceptor dopant removes an electron from the polymer, the polymer becoming oxidized to a polycation and the dopant becoming reduced to an anion. Alternatively, the polymer can be rendered electroactive by electrochemical oxidation or reduction. In this case an electron is removed from or added to the polymer from an electrode, and charge-compensating anions or cations, respectively, are incorporated into the polymer from the supporting electrolyte solution.

In both cases the resulting electroactive polymer consists of a charged polymer backbone incorporating charge-compensating ionic dopants. A suitable positively charged compensating dopant can be a cation such as the alkali metal ions, alkali earth metal ions, Group III metal ions, strong Lewis acids, and organic cations such as

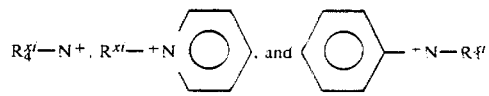

where $R^{xi}$ is a straight- or branched-chain alkyl group of $C_1$-$C_6$. Mixtures of these charge-compensating dopants can be employed. These ionic dopants produce n-type conductivity when associated with a reduced or negatively charged polymer polyanion.

A suitable negatively charged compensating dopant, i.e. anionic dopants, can be an anion such as the halogen ions, other ions such as $AsF_4^-$, and preferably ions such as $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, organic anions ions such as $CH_3CO_2^-$ (acetate), $C_6H_5CO_2^-$ (benzoate), $CH_3C_6H_4SO_3^-$ (tosylate), strong Lewis bases, and the like. Mixtures of the charge-compensating dopants can be employed. These ionic dopants produce a p-type conductivity when associated with an oxidized or positively charged polymer polycation.

The dopant modified electroactive polymer has a charge opposite to the conductivity modifier, i.e. ionic dopant. The charges on the dopant modified electroactive polymer and the ionic dopant balance so that the dopant modified electroactive polymer is an electrically neutral system. The association of the virgin polymer with electron donor dopants produces an electroactive polymer which exhibits n-type conductivity. More specifically, reduction of the virgin polymer and the incorporation of cationic charge-compensating dopants produces a polymer which exhibits n-type conductivity. The association of the virgin polymer with electron acceptor dopants produces an electroactive polymer with p-type conductivity. More specifically, oxidation of the polymer and incorporation of anionic charge-compensating dopants produces a polymer with p-type conductivity.

The preferred electroactive polymers of the invention have the following formula:

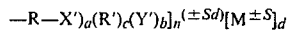

where a is either 0 or 1; b is either 0 or 1; c is either 0 or 1; n is an integer from 2 to 1,000; d is an integer from 1 to 2,000; S is an integer from 1 to 3; R and R' are each independently 1,3,4-heterodiazoles, wherein the heteroatom is oxygen or sulfur; X' and Y' are each independently connecting units comprising a single atom, or a group of atoms; and M is an atom or a group of atoms acting as a charge-compensating ionic dopant whose electrical charge is opposite to the charge exhibited by the recurring repeat units of the polymer backbone:

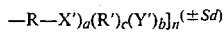

The repeat units form the polyanion or polycation of the electroactive polymer.

The R and R' groups are independently heterodiazole rings, wherein the heteroatom is oxygen or sulfur. More particularly, R and R' are oxadiazole or thiadiazole diradicals selected from those of the following formulae:

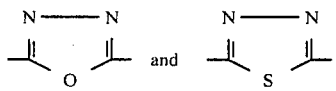

More specifically, R and R' are the heterodiazole diradicals previously recited or mixtures of the diradicals which are linked to one another either directly or via the connecting units X' and Y' by forming bridges.

The connecting units X' and Y' can be selected from the group comprising: —O—; —S—;

—CH=CH—; —C≡C—; —CH=CH—CH=CH—; —CH=CH—S—CH=CH—;

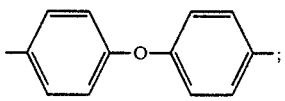

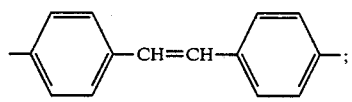

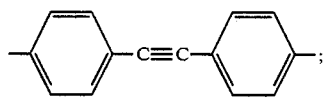

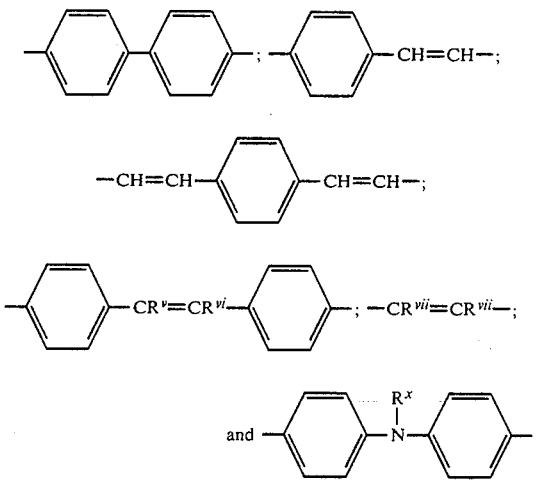

wherein $R_1$ is lower alkyl $C_1$-$C_6$, aryl, cycloalkyl and alkoxy; $R^v$, $R^{vi}$ and $R^{vii}$ are H or methyl, methoxy, halogen and mixtures thereof; and $R^x$ is $C_1$-$C_4$ alkyl. 4,4'-Biphenylene, vinylene, 1,4-phenylene, and acetylene connecting groups are preferred connecting units. Especially preferred connecting units are 1,4-phenylene, and 4,4'-N-alkylaminodiphenylene.

The molecular weight determines the physical properties of the electroactive polymer. The magnitude of n is a function of the molecular weight. Preferably, n is from 5 to 500. Most preferably, n is from 10 to 300. Molecular weights of the polymer should be between about 250 and 250,000. A preferred molecular weight is above about 10,000. Tractable films are formed with electroactive polymers wherein n is adjusted so that the molecular weight exceeds 10,000.

The enhancement in conductivity of the electroactive polymer above the conductivity of polymer in the virgin state is determined by d. The value for d is not greater than 2 n. The conductivity is increased and adjusted by increasing d. Conductivities in the semiconductor region can generally be achieved with d values of about 5 percent the n value, e.g., d equals 5 when n equals 100.

Preferred electroactive polymers are doped polymers that have conductivities greater than about $1 \times 10^{-10}$ ohm$^{-1}$ cm$^{-1}$, most preferably greater than $1 \times 10^{-4}$ ohm$^{-1}$ cm$^{-1}$. Greater concentrations of the charge-compensating ionic dopant M increase the conductivity to the metallic conductivity regime. The charge-compensating cationic or anionic dopant M is selected from the previously recited dopants and the like. M remains the same for all the following preferred polymers.

The R and R' groups may be the same or different. When a is 1, b and c are zero, R' and Y' drop out and the polymer has the following formula:

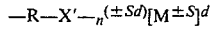

A preferred n-type polymer of this formula is poly-1,4-phenylene-2,5-(1,3,4-oxadiazole) doped with a conductivity modifier. A preferred p-type plymer of this formula is poly-4,4'-N-methylaminodiphenylene-2,5-(1,3,4-oxadiazole) doped with a conductivity modifier.

When a and c are 1 and b is zero, Y' drops out and the polymer has the formula:

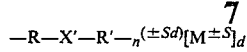

A preferred n-tye polymer of this formula is poly-5,5'-(1,4-phenylene-bis-2,2'-(1,3,4-oxadiazole)) doped with a conductivity modifier.

When a is zero and b and c are 1, X' drops out and the polymer has the formula:

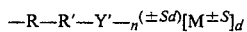

When a, b, and c are zero, R', X', Y' drop out and the polymer has the formula:

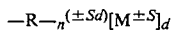

A preferred n-type polymer of this formula is poly-2,5-(1,3,4-oxadiazole) doped with a conductivity modifier.

The polymers of the present invention are single ring heterocyclic compounds joined together to form a conjugated polymeric system. The heterocyclic rings that are contemplated herein are heterodiazoles, wherein the heteroatom is oxygen or sulfur. These are two ring systems included in this description, namely, oxadiazoles and thiadiazoles. The symmetrical ring systems of the invention include the 1,3,4-oxadiazoles and thiadiazoles. These ring systems are joined together, either directly or through a connecting group or groups, to form polymers having molecular weights in the range of about 250 to 250,000 preferably above about 10,000. The bonds connecting the ring systems into polymers are at the carbon atoms of the ring. These ring systems have the following formula:

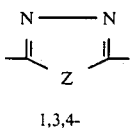

1,3,4- wherein Z is oxygen or sulfur. Preferred polymers are those containing the 1,3,4-oxadiazole ring.

Although the polymers of the invention can be made up solely of heterodiazoles, the preferred materials are copolymers wherein the heterodiazole rings are connected through another group, designated a connecting unit. In general, the connecting units should preserve the conjugation of the heterodiazole rings. The connecting units themselves must either be conjugated or maintain pi orbital overlap with the heterocyclic ring systems.

Connecting units may be selected from heteroatoms, such as the Group VB and VIB elements of the Periodic Table, including oxygen, sulfur, selenium, tellurium, monosubstituted nitrogen, phosphorus, arsenic or antimony. Preferably, the connecting units are conjugated carbon systems, such as olefins or aryl ring systems. The connecting units may also be selected from heterocyclic ring systems.

Olefinic connecting units are those obtained by removing a hydrogen atom from each end of the olefinic double bond or from each end of a conjugated double bond system. Typical olefinic connecting units include those obtained from ethylene, butadiene, cyclopentadiene, divinylether, and the like.

Aryl ring connecting units are obtained from the corresponding aromatic compounds by removing two hydrogen atoms from carbon atoms in the aromatic ring system. Typical aromatic connecting groups include those obtained from benzene, naphthalene, diphenyl, diphenyl ether, diphenyl sulfide, diphenylalkylamine, anthracene, and the like. Other aryl connecting groups are obtained from alkyl or alkenyl aromatics, by removing two hydrogen atoms, either from the ring, from the alkenyl group, or one hydrogen each from the ring and from the alkenyl group. Typical connecting groups of this type include those obtained from styrene, divinylbenzene, stilbene, and the like.

Heterocyclic connecting units include those obtained from various five- and six-membered heterocyclic systems having at least one nitrogen atom. Preferably, heterocyclic connecting units are incorporated into n-type polymers. These connecting units are obtained by removing one hydrogen from each of two carbon atoms making up the ring system. Typical six-membered connecting units include those obtained from pyridine, pyrimidine, pyrazine, pyridazine, 1,2,4-triazine, 1,3,5-triazine, and the like. Typical five-membered connecting units include those obtained from 1,3-diazoles, 1,3-oxazoles, 1,3-thiazoles, 1,3,4-triazoles, and the like. Fused heterocyclic ring systems which are either conjugated or maintain pi orbital overlap are also suitable as connecting units.

Polymer Fabrication

The starting material for preparing the electroactive polymers of this invention are polymers and copolymers comprising recurring units of heterodiazoles, wherein the heteroatom is oxygen or sulfur. In particular, the recurring units are oxadiazoles or thiadiazoles. These polymers and copolymers are well known materials having been synthesized in a variety of ways.

The compounds of this invention are prepared by chemical or electrochemical doping of heterodiazole polymers. These polymers are made via several alternative procedures depending on the available starting materials and on the heterodiazole ring system desired. The following preparative methods are satisfactory.

1,3,4-Heterodiazole

The 1,3,4-oxadiazoles are made from hydrazine and a dibasic acid or acid derivative. In one scheme, equimolar amounts of the acid and hydrazine are allowed to react at elevated temperatures to thereby produce the undoped polymer. This procedure has been described in the literature (Ref. J. Polym. Sci. 3, 45 (1965)). The above reactions are carried out in an inert, temperature stable solvent, preferably polyphosphoric acid, sulfuric acid and the like. Temperatures of reaction range from 100° to 250° C.; preferably from 140° to 180° C.

An alternative method for preparing the undoped polymers of this invention involves first preparing the dihydrazide of the dibasic acid and then reacting this material with an equal molar amount of a dibasic acid. This method is useful for incorporating two different connecting groups in an alternating sequence. The preparation of a dihydrazide is a well-known procedure (Ref. J. Polym. Sci. A2, 1157 (1964)). The conditions of the second step of the scheme are similar to those of the one-step procedure, previously described.

The thiadiazole compounds are made from the corresponding dithioic acids by procedures similar to those used for preparing oxadiazoles. Furthermore, the oxadiazole polymer may be converted to the thiadiazole polymer by heating the former with phosphorus pentasulfide in the presence of a high-boiling acidic solvent such as polyphosphoric acid. Temperatures for this reaction are in the range of 150° to 300° C., preferably 200° to 250° C.

Another method for preparing the thiadiazole polymers of this invention involves first making a linear polyhydrazide from equimolar quantities of the appropriate dibasic acid chloride and hydrazine. This polymer is then reacted with phosphorus sulfide at elevated temperatures in a high-boiling solvent as before. This is the preferred route.

Another route to the thiadiazole polymers involves the reaction of hydrazine or salt thereof with an equal molar amount of an appropriate dithioamide. The solvent and reaction conditions for this process are the same as described above for the other procedures. The dithioamide starting materials are prepared by the reaction of hydrogen sulfide and a dinitrile.

The dibasic acids useful in the above procedures are well-known compounds, previously described and readily available. Hydrazine for the process is a commercially available material. It may be used as such, but preferably, for ease of handling, it is usually employed in the form of a salt. The sulfate, tetrafluoroborate, halide, or phosphate salts are all satisfactory.

Tractable Polymer Fabrication

Subsequent to polymerization, articles such as fibers, ribbons, or free-standing films are cast from solution. The solution is formed by dissolving the desired polymer in a solvent which consists of sulfuric acid, formic acid, methane sulfonic or polyphosphoric acid. The solution temperature is generally from about 20° C. to about 100° C. The polymers are coagulated into solid shapes such as fibers, ribbons, or free-standing films in a basic coagulation bath. For free-standing films, the polymers are fabricated from solutions containing about 2 to 25% polymer dissolved in the solvent. At concentrations which exceed 10%, the cast films take on an anisotropic morphology. The anisotropic property enhances the conductivity in the anisotropic direction. An amine, for example triethylamine, dissolved in a protonic solvent such as $H_2O$ and preferably ethyl alcohol comprises the coagulation bath. The bath is maintained at a lower temperature than the dissolution temperature of the polymer in the solvent. Usually room temperature is selected as the operating temperature of the coagulation bath. The fabricated articles are dried. Elevated temperatures, usually 60° C., and reduced pressure accelerated the drying process. Drying is continued until no further weight loss is observed.

Alternatively, films are cast into water, comprising the coagulation bath, followed by neutralization in aqueous bicarbonate. Neutralized films are washed in water and dried at elevated temperatures, 60°-100° C., under reduced pressure.

Polymer Conductivity Modification

After fabrication of the desired articles from the heterocyclic polymers by means of the procedure described above, the articles are rendered electroactive by, for example, chemical or electrochemical procedures. The articles can be rendered electroactive in an atmosphere which is inert with respect to the polymer and dopant, by contacting them with suitable conductivity modifiers, i.e. dopants. An inert atmosphere is defined as an atmosphere which does not react with the polymer, the dopant, or the electroactive polymer. For example, the atmosphere can be argon, helium, and nitrogen and the like. The doping can also be carried out in an inert liquid medium such as tetrahydrofuran, acetonitrile and the like. The inert liquid medium should be able to wet and swell the polymer but not react with it. The dopants can be oxidizing or electron accepting molecules, or reducing or electron donating molecules. Both types of dopants may be in the form of gases or vapors, pure liquids or liquid solutions. Preferably, oxygen and water moisture are excluded during and after the doping process because the conductive polymers tend to degrade, i.e. lose conductivity, when exposed thereto.

For example, the polymer can be contacted with conductivity modifiers, such as alkali naphthalides or alkali anthracenides such as sodium naphthalide, potassium naphthalide, or sodium anthracenide in a tetrahydrofuran solution. The conductivity modifier concentration can be from about 0.001 to about 1 molar and preferably from about 0.01 to about 0.5 molar in the THF or other suitable solvent. Alternative doping methods are taught in U.S. Pat. No. 4,204,216 and incorporated herein by reference.

The incorporation of the dopants into the polymer can be observed by a color change in the polymer as well as an enhanced conductivity. For example, a virgin polymer film having a yellow, orange or brown color, changes to a green, blue or black color with a metallic luster upon doping and the measured conductivity increases by many orders of magnitude.

Alternatively, the polymers can be oxidized or reduced to their conductive forms using electrochemical techniques. In this method, herein referred to as electrochemical doping, the polymer is immersed in a suitable electrolyte solution and used as one electrode of an electrochemical cell. Upon passing an electric current through such a cell the polymer becomes reduced (or oxidized, depending upon the direction of current flow) and charge-compensating cations (or anions) from the supporting electrolyte become incorporated into the polymer. This doping also proceeds with the characteristic color change described above. Thus, the polymer can be electrochemically doped with whatever appropriately charged ion is present in the electrolyte solution. Electrolyte solutions are comprised of a salt dissolved in a solvent. Suitable solvents are acetonitrile, tetrahydrofuran, 2-methyl-tetrahydrofuran, propylene carbonate, dimethylformamide, dimethylsulfoxide and the like. Alternative electrolytes are specified in U.S. application Ser. No. 334,509, filed Dec. 28, 1981, entitled "Batteries Fabricated With Electroactive Polymers", and completely incorporated herein by reference. Suitable cations are $Li^+$, $Na^+$, $K^+$, $(CH_3)_4N^+$, $(C_2H_5)_4N^+$ and $(C_4H_9)_4N^+$. Suitable anions are $Cl^-$, $Br^-$, $ClO_4^-$, $BF_4^-$, and $PF_6^-$. The extent of doping can be easily controlled by adjusting the amount of charge electrochemically injected into the polymer, either by controlling the magnitude of the current used (galvanostatic charging) or by controlling the potential of the polymer electrode with respect to a reference electrode (potentiostatic charging).

The above-described electrochemical doping process is completely reversible. The polymer can be "updoped" and returned to its original, neutral, non-conducting state simply by applying a current opposite in sign to that used for the doping process. Upon complete updoping the color of the polymer reverts back to its original color. Thus, for example, a reduced, conducting polyoxadiazole polymer can be reoxidized completely to its neutral, non-conducting form, and the charge-compensating cations incorporated during the electrochemical reduction process are expelled from the article during electrochemical re-oxidation.

Having described the methods of fabrication and the basic heterocyclic systems, the following examples are intended to be illustrative of the invention and not meant to limit the scope thereof. Modification which would be obvious to one of ordinary skill in the art are contemplated to be within the scope of the invention.

EXAMPLES

Example 1

Poly-1,4-phenylene-2,5-(1,3,4-oxadiazole)

a. Preparation:

A 200 ml 3-neck flask, equipped with thermometer, stirrer, and an addition funnel, was charged with 110 g of 115.4% polyphosphoric acid and 6.6 g (0.05 mol) of hydrazine sulfate. This mixture was heated to 130° C. at which time, 6.93 g (0.0417 mol) of terephthalic acid was added. The temperature was raised to 140° C. and held there for 5 hours. Finally, the temperature was held at 180° C. for 3 additional hours. The viscosity of the crude reaction mixture increased throughout the run.

The crude product, a tough elastic substance, was removed from the reaction flask and added to a beaker with excess water. This slurry was washed repeatedly in a blender until the wash water was neutral. Then the solid polymer was stirred in 500 ml of 5% sodium carbonate for 16 hours. The solid was isolated by filtration, washed with water and dried to give 6.1 g of poly-1,4-phenylene-2,5-(1,3,4-oxadiazole) having a pale orange color. This product was soluble in concentrated sulfuric acid. The specific viscosity of an 0.276 weight percent solution in sulfuric acid was 1.1223 centistokes.

b. Chemical Doping:

The product of Example 1a, 0.5184 g, was dissolved in 9.9416 g of concentrated sulfuric acid to form a honey-colored solution having a concentration of 4.96 weight percent. A film was cast onto a glass plate from this solution using a warm 7 mil doctor blade. The glass plate, with film, was immediately immersed into a 10% triethyl amine in ethanol solution. The film floated free of the plate. After neutralization, the film was dried in a vacuum oven at 60° C. under 25 mm Hg. pressure for 16 hours. The dried film was $6.14 \times 10^{-4}$ cm. thick, with a yellow cream coloration.

The dried film was placed on a glass slide and wet with tetrahydrofuran. Next it was contacted with an 0.088 molar solution of sodium anthracenide in tetrahydrofuran. The film turned red and then a green metallic luster developed. Conductivity measurements were made using the 4-point probe apparatus. Using this technique, the chemically doped film had a conductivity of 10 siemens per cm.

c. Electrochemical Doping of Polymer on a Wire:

The product of Example 1a was dissolved in concentrated sulfuric acid to give a 2.56 weight percent solution. A platinum wire, 0.5 mm in diameter, was dipped into this solution. After removing it from the solution, excess liquid was gently wiped off and then the wire was placed in a water bath for 30 minutes at ambient temperature. Next it was soaked in a 5% sodium bicarbonate solution for 16 hours. At the end of this time the wire was rinsed with water, rinsed with acetone, and then dried under vacuum.

The resulting polymer-coated wire was submitted to a cyclic voltametric analysis. For this analysis, the electrolyte was an 0.1 molar solution of tetraethylammonium tetrafluoroborate in acetonitrile. Measurements were made with reference to a silver/silver nitrate reference electrode and subsequently converted into voltages with the standard calomel electrode (SCE). A reversible reduction potential of $-2.1$ v vs. SCE was obtained.

d. Electrochemical Doping of a Film:

A $1.2 \times 1^{-3}$ cm thick film was prepared by a procedure similar to that of Example 1b, using a 3 mil doctor blade. This film was immersed in an 0.1 molar solution of tetraethylammonium tetrafluoroborate in acetonitrile. The flat surface of the film was firmly contacted with a flat, gold working electrode. A silver/silver nitrate reference electrode and a platinum auxiliary electrode were immersed into the solution. The working electrode potential was swept from $-0.5$ v to $-2.5$ v at a rate of 10 millivolts per second, then held at $-2.5$ v for 10 minutes to effect electrochemical doping.

At the end of this time, the film was removed from the electrolyte, rinsed with acetonitrile, and then dried for 4 minutes. The previously described 4-point probe apparatus was used to determine the conductivity of this film. An average value of 1.01 siemens per cm was measured.

e. Preparation:

The same polymer was prepared by the reaction of an equimolar mixture of terephthalic acid and terephthaloyl dihydrazide in polyphosphoric acid.

Example 2

Random Copolymer of 1,3,4-oxadiazole With 1,3- and 1,4-phenylene Units a. Preparation:

The apparatus of Example 1a was charged with 110 g of polyphosphoric acid. After heating to 140° C., 6.6 g (0.05 mol) of hydrazine sulfate was added, followed by a mixture containing 3.47 g (0.0417 mol) each of isophthalic acid and terephthalic acid. Heating was continued at 140° C. for 4 hours; then the temperature was raised to 180° C. for 2 hours.

The product was cut up in a blender as described in Example 1a. Then it was neutralized by mixing with 10% triethylamine-ethanol solution. After washing with ethanol and drying, there was obtained 6.11 g of the desired copolymer. An 0.272 weight percent solution in concentrated sulfuric acid had a specific viscosity of 0.715 centistokes.

b. Chemical Doping:

The polymer of Example 2a, 0.52 g, was dissolved in 10.05 g of methane sulfonic acid to give a 4.92% solution. Films were cast from this solution using a 7 mil doctor blade. After being formed, the films were neutralized in a 10% triethylamine-ethanol solution. The result was a clear, pale, cream-colored film which was dried as before.

The film was contacted with tetrahydrofuran and then immersed in an 0.088 molar solution of sodium anthracenide in tetrahydrofuran. The color of the film changed to dark brown. Attempts to measure conductivities failed because the film shredded under the pressure of the 4-point probe.

Example 3

Alternating Copolymer of 1,3,4-oxadiazole With 1,3- And 1,4-phenylene Units a. Preparation:

The apparatus of Example 1a was charged with 110 g of polyphosphoric acid, 3.49 g (0.021 mol) of isophthalic acid, 4.07 g (0.021 mol) of terephthaloyldihydrazide and 1.04 g (0.008 mol) of hydrazine sulfate. This mixture was heated at 140° C. for 60 hours and at 180° C. for 8 additional hours.

After working up as in Example 2a, the polymer was extracted (Soxhlet) with ethanol for 16 hours. After drying at 60° C. in a vacuum oven, there was obtained 5.92 g of a polymer having 1,3,4-oxadiazole units alternately attached through the 2,5-positions to 1,4-phenylene and 1,3-phenylene connecting units.

b. Electrochemical Doping:

A platinum wire was coated with the polymer of Example 3a by the procedure of Example 1c. The cyclic voltametric analysis, carried out as before, gave a reduction potential of $-2.1$ v vs. SCE. Upon repeated charge/discharge cycles, the current decayed measurably.

Example 4

Random Copolymer of Oxadiazole and Thiadiazole with 1,4-phenylene Connecting Units a. Preparation:

A 200 ml 3-neck flask equipped with a stirrer, thermometer, nitrogen inlet tube, and a condenser was charged with 120 g of polyphosphoric acid. After heating this acid to 140° C., 7.8 g (0.06 mol) of hydrazine sulfate was added. Next a mixture of 6.93 g (0.0417 mol) of terephthalic acid and 4.44 g (0.02 mol) of phosphorus pentasulfide was added. Heating at 140° C. was continued for 24 hours.

This product was worked up as described in Example 1a, to give 5.92 g of the desired copolymer. Sulfur analysis indicated that the number of oxadiazole units exceeded the number of thiadiazole units.

b. Chemical Doping:

The copolymer of Example 4a was cast into a film having a thickness of $9.67 \times 10^{-4}$ cm. This film was doped and tested for conductivity by the procedure of Example 1b. Using the 4-point probe apparatus, a conductivity value of 0.5279 siemens per cm was obtained.

c. Electrochemical Doping:

The polymer of Example 4a was coated onto a wire by the method of Example 1c. The reversible reduction potential was $-2.1$ v vs. SCE.

Example 5

Random Copolymer of Oxadiazole and Thiadiazole a. Preparation:

The procedure of Example 4a was followed except that after heating at 140° C. for 24 hours, the temperature was raised to 170° C. After 3 hours at this temperature, 43.5 g of polyphosphoric acid was added, and heating was continued at 180° C. for 5 hours.

The polymeric product was very tough. It was charged to a blender along with water and cut into fine particles. The polymer was isolated by filtration, neutralized with triethylamine, washed with hot ethanol, and then extracted with ethanol for about 60 hours on a Soxhlet extractor. After drying, the product weighed 6.7 g. Sulfur analysis indicated that the polymer had more thiadiazole units than oxadiazole units.

b. Chemical Doping:

The copolymer of Example 5a was formed into a $1.11 \times 10^{-3}$ cm thick film by the method of Example 1b, but using methane sulfonic acid in place of sulfuric acid as the solvent. This film was shown to have a conductivity of 0.185 siemens per cm by the 4-point probe technique.

c. Electrochemical Doping:

A platinum wire was coated with the copolymer of Example 5a. A cyclic voltametric analysis showed the material to have a reversible reduction potential of $-2.0$ v vs. SCE.

Example 6

Poly-1,4-phenylene-2,5-(1,3,4-thiadiazole)

a. Preparation of Poly-1,4-phenylenedihydrazide:

The apparatus of Example 1a was charged with 100 ml of hexamethylphophoramide and 15 g of lithium chloride. After stirring at room temperature for about 10 minutes, 3.88 g (0.02 mol) of terephthaloyl dihydrazide (Ref. JACS 88, 950 (1966)) was added and the temperature was raised to 50° C. The mixture was stirred at this temperature until solution was essentially complete. Then the mixture was cooled to about 0° C. and 4.06 g (0.02 mol) of terephthaloyl chloride was added in 4 parts over a period of 30 minutes, while maintaining the temperature below 5° C. When addition was complete, the mixture was stirred at 5° C. for 1 hour and at 20° C. for 1 hour. Finally the crude reaction mixture was poured onto ice and filtered. The solid product was washed with water until neutral. After drying, 6.71 g of poly-1,4-phenylene dihydrazide was obtained.

b. Preparation of Polymer:

A 100 ml 3-neck flask equipped as in Example 1a was charged with 110 g of polyphosphoric acid, 3.0 g (0.015 mol) of poly-1,4-phenylene dihydrazide and 2.5 g (0.011 mol) of phosphorus pentasulfide. The resulting mixture was heated at 140° C. for 16 hours. Then the temperature was raised to 180° C. for 4 hours.

The crude product was charged to a blender along with water and was there cut into fine particles. These particles were isolated by filtration and then neutralized with 10% ethanolic triethylamine. The resulting material was extracted with ethanol in a Soxhlet extractor for 3 days. After drying the product weighed 2.22 g.

c. Electrochemical Doping:

A platinum wire was coated with the polymer of Example 6b using the method of Example 1c. A cyclic voltametric analysis gave a reversible reduction potential of $-2.0$ v vs. SCE.

Example 7

Poly-4,4'-N-methylaminodiphenylene-2,5-(1,3,4-oxadiazole)

1. Preparation:

A 100-ml, 3-neck flask, equipped with a mechanical stirrer and nitrogen inlet, was charged with 1.0 g (0.004 mole) of N-methyldiphenylamine-4,4'-dicarboxylic acid, 0.27 g (0.004 mole) of hydrazine hydrochloride, and 40 g of polyphosphoric acid. The mixture was stirred at 60°–70° C. during 16 hours and then the temperature was raised to 125° C. during 4 hours. The temperature was held at 125° C. for 16 hours, by which time the viscosity of the brown solution had greatly increased. A sample was withdrawn and coated on platinum wires for cyclic voltametric examination. The remainder was kept at 125° C. another 24 hours and then poured into water. The yellow-green, elastic precipitate was slurried overnight in 10% aqueous sodium carbonate and then washed with water, ethanol, and finally, chloroform. Infrared spectroscopy of the polymer showed no remaining carbonyl group but only a strong band at 1600 cm$^{-1}$, characteristic of the C-N stretch of the oxadiazole.

b. Electrochemical Doping:

A platinum wire was coated with the polymer of the example using the method of Example 1c. A cyclic voltametric analysis gave a reversible oxidation potential of +0.8 v vs. SCE.

What is claimed is:

1. A tractable electroactive polymer which comprises a charged polymer backbone of recurring units of a monocyclic 1,3,4-heterodiazole, wherein the heteroatom is oxygen or sulfur, and a sufficient concentration of a charge-compensating ionic dopant associated therewith, wherein the polymer backbone is capable of undergoing reversible oxidation or reversible reduction or both to form the charged polymer backbone.

2. The electroactive polymer according to claim 1, wherein the recurring units are selected from the group consisting of 1,3,4-oxadiazole, 1,3,4-thiadiazole, and mixtures thereof.

3. The electroactive polymer according to claim 2, wherein the recurring units are 1,3,4-oxadiazoles.

4. The electroactive polymer according to claim 2, wherein the recurring units are 1,3,4-thiadiazoles.

5. The electroactive polymer according to claim 1, wherein the recurring units are interspersed with connecting units selected from the group consisting of:

—O—; —S—;

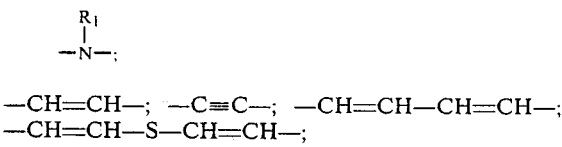

—CH=CH—; —C≡C—; —CH=CH—CH=CH—; —CH=CH—S—CH=CH—;

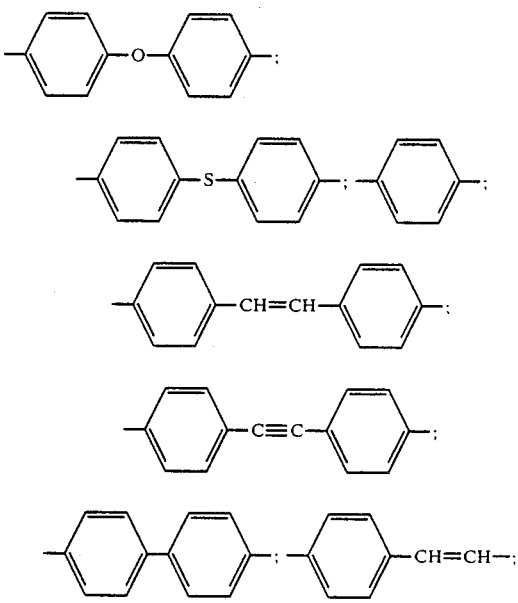

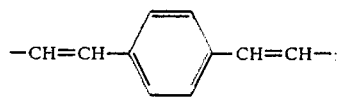

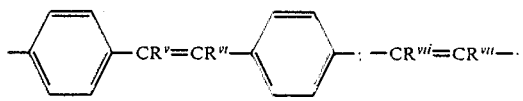

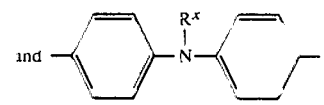

wherein R$_1$ is lower alkyl C$_1$-C$_6$, aryl, cycloalkyl, and alkoxy; R$^v$, R$^{vi}$ and R$^{vii}$ are H, methyl, methoxy, halogen, and mixtures thereof; and R$^x$ is C$_1$-C$_4$ alkyl.

6. The electroactive polymer according to claim 5, wherein the connecting units are selected from the group consisting of 1,4-phenylene, 4,4'-biphenylene, vinylene, and ethynylene.

7. The electroactive polymer according to claim 6, wherein the connecting unit is 1,4-phenylene.

8. The electroactive polymer according to claim 5, wherein the connecting unit is 4,4'-N-alkylaminodiphenylene.

9. The electroactive polymer according to claim 1, wherein the charge-compensating ionic dopant is a cation selected from the group consisting of the alkali metal ions, alkali earth metal ions, Group III metal ions,

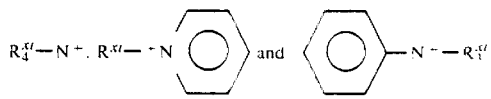

wherein R$^{xi}$ is a straight- or branched-chain alkyl group of C$_1$-C$_6$, or mixtures of said cations.

10. The electroactive polymer according to claim 1, wherein the polymer backbone has a molecular weight of from about 250 to about 250,000.

11. The electroactive polymer according to claim 10, wherein the polymer backbone has a molecular weight above about 10,000.

12. A tractable electroactive polymer which comprises a charged polymer backbone and charge-compensating ionic dopants associated therewith of the formula:

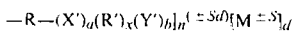

wherein a is 0 or 1; b is 0 or 1; c is 0 or 1; n is an integer from 2 to 1,000; d is an integer from 1 to 2,000; S is an integer from 1 to 3; R and R' are each independently monocyclic 1,3,4-heterodiazoles, wherein the heteroatom is oxygen or sulfur; X' and Y' are each independently connecting units selected from the group consisting of:

—O—; —S—;

—CH=CH—; —C≡C—; —CH=CH—CH=CH—; —CH=CH—S—CH=CH—;

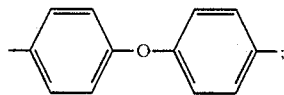

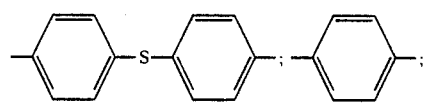

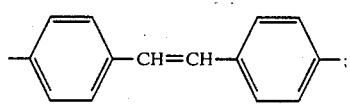

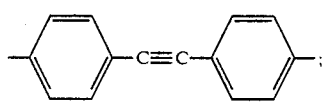

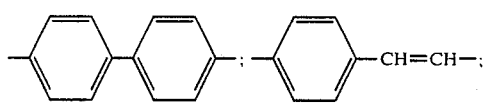

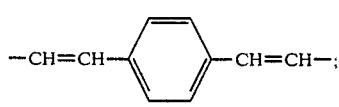

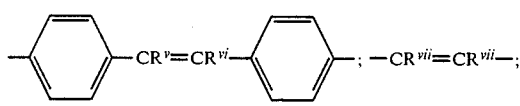

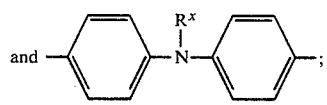

wherein $R_1$ is lower alkyl $C_1$–$C_6$, aryl, cycloalkyl, and alkoxy; $R^v$, $R^{vi}$ and $R^{vii}$ are H, methyl, methoxy, halogen, and mixtures thereof; and $R^x$ is $C_1$–$C_4$ alkyl; and M is a charge-compensating ionic dopant of opposite electrical charge to the charge of the polymer backbone; wherein the polymer backbone is capable of undergoing reversible oxidation or reversible reduction or both to form the charged polymer backbone.

13. The electroactive polymer according to claim 12, wherein R and R' are each diradicals independently selected from the group consisting of

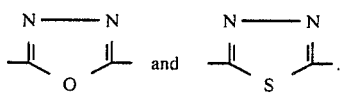

14. The electroactive polymer according to claim 13, wherein R and R' are each diradicals of the formula:

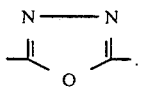

15. The electroactive polymer according to claim 13, wherein R and R' are each diradicals of the formula:

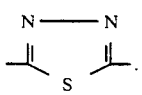

16. The electroactive polymer according to claim 12, wherein X' and Y' are independently selected from the group consisting of 1,4-phenylene, 4,4'-biphenylene, vinylene and ethynylene.

17. The electroactive polymer according to claim 16, wherein X' and Y' are 1,4-phenylene.

18. The electroactive polymer according to claim 12, wherein X' and Y' are 4,4'-N-alkylaminodiphenylene.

19. The electroactive polymer according to claim 12, wherein n is from about 5 to about 500.

20. The electroactive polymer according to claim 12, wherein a is 1, b and c are zero, and the polymer has the formula:

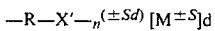

21. The electroactive polymer according to claim 12, wherein a, b and c are zero, and the polymer has the formula:

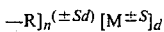

22. The electroactive polymer according to claim 12, wherein the charge-compensating ionic dopant M is a cation selected from the group consisting of the alkali metal ions, alkali earth metal ions, Group III metal ions, and

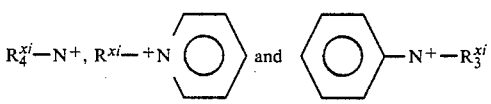

wherein $R^{xi}$ is a straight- or branched-chain alkyl of $C_1$–$C_6$, or mixtures of said cations.

23. Poly-4,4'-N-methylaminodiphenylene-2,5-(1,3,4-oxadiazole).

* * * * *

UNITED STATES PATENT AND TRADEMARK OFFICE
CERTIFICATE OF CORRECTION

PATENT NO. : 4,505,843
DATED : March 19, 1985
INVENTOR(S) : Shigeto Suzuki et al It is certified that error appears in the above-identified patent and that said Letters Patent are hereby corrected as shown below:

Column 2, line 42 "442,397 entitled" should read --442,397 (Attorney Docket No. C-1700), entitled--.

Column 2, line 43 "442,398 entitled" should read --442,398, (Attorney Docket No. C-1701), entitled"--.

Column 5, line 8 "-R -X'..." should read -- $+R+X'...$ --.

Column 5, line 20 "-R..." should read -- $+R...$ --.

Column 6, line 59 "-R-X'..." should read $+R-X'+...$--.

Column 7, line 1 "-R-X'-R'$_n$..." should read -- $+R-X'-R'+$ .. --.

Column 7, line 9 "-R-R'-Y'..." should read -- $+R-R'-Y'+...$--.

Column 7, line 13 "-R-..." should read -- $+R+...$--.

Claim 12, column 16, line 59 "-R-(X')$_a$(R')$_x$(Y')$_b$]$_n$..." should read -- $+R-(X'+_a+R'+_c-(Y'+_b+_n...$--.

Claim 20, column 18, line 39 "-R-X'-$_n$..." should read -- $+R-X'+_n...$--.

Claim 21, Column 18, line 44 "-R..." should read -- $+R...$--.

Signed and Sealed this

Tenth Day of November, 1987

Attest:

DONALD J. QUIGG

Attesting Officer

Commissioner of Patents and Trademarks